United States Patent [19]

Erickson et al.

[11] 3,825,287
[45] July 23, 1974

[54] HIGH PRESSURE MANIFOLD COUPLING MEANS

[75] Inventors: Rodney R. Erickson; Donald L. Hopkins, both of Joliet; William B. Norick, Dunlap, all of Ill.

[73] Assignee: Caterpillar Tractor Co., Peoria, Ill.

[22] Filed: Nov. 1, 1972

[21] Appl. No.: 302,775

[52] U.S. Cl. ............................................. 285/137 R
[51] Int. Cl. ............................................. F16l 39/00
[58] Field of Search .......... 285/95, 106, 189, 137 R, 285/223, 19, 93, 335, 340, 230

[56] References Cited
UNITED STATES PATENTS

| | | | |
|---|---|---|---|
| 521,017 | 6/1894 | Condict | 285/19 |
| 1,518,368 | 12/1924 | Steed | 285/106 X |
| 2,021,745 | 11/1935 | Pfefferle et al. | 285/340 |
| 2,510,125 | 6/1950 | Meakin | 285/137 R X |
| 2,966,539 | 12/1960 | Sears et al. | 285/106 X |
| 3,066,961 | 12/1962 | Gerin | 285/230 |
| 3,221,808 | 12/1965 | Pyle | 285/137 X |
| 3,353,848 | 11/1967 | Bleasby | 285/19 |
| 3,637,239 | 1/1972 | Daniel | 285/93 |
| 3,653,695 | 4/1972 | Dunton et al. | 285/340 |

*Primary Examiner*—Alfred R. Guest
*Attorney, Agent, or Firm*—Phillips, Moore, Weissenberger Lempio & Strabala

[57] ABSTRACT

A high pressure fluid coupling means provides a fluid tight connection between two separable members in a fluid circuit while concurrently allowing slight axial and lateral misalignment between such members. An expansible, flexible seal ring provides sealing with movement accommodation while a rigid back-up ring abuts said expansible, flexible seal ring to prevent it from dislodging from the coupling under the influence of high fluid pressure. The coupling mean is used to connect the respective inlet and outlet manifolds in a hydraulic motor-pump set.

8 Claims, 3 Drawing Figures

PATENTED JUL 23 1974  3,825,287

3,825,287

HIGH PRESSURE MANIFOLD COUPLING MEANS

BACKGROUND OF THE INVENTION

In hydrostatic transmission arrangements comprising hydraulic pump and motor sets, rigid manifolds are usually employed to convey high pressure fluid between the pump and motor components. In large industrial systems such manifolds must be capable of conveying very high pressure fluid and the couplings for such manifolds must be particularly well sealed. In such installations it is often difficult to achieve an exact alignment of the pump and motor components so as to provide effective sealing with a rigid coupling. It is therefore desirable to provide a form of coupling which allows some degree of freedom of relative movement of such manifolds, both axially and laterally with respect to the pump motor set so that slight misalignment of the components may be accommodated.

Movement accommodating joints and couplings of various designs are, of course, well known in the art. However, in the prior art there seems to be a necessary trade-off between the flexibility of the coupling and its ability to properly seal the coupled members. Highly complex and expensive sealing systems have been developed to meet these countervailing requirements but such systems have for one reason or another failed to achieve the desired results, particularly when used in high pressure industrial systems.

Some prior art couplings which are intended to accommodate sliding or angular movement of coupled members are shown in U.S. Pat. Nos. 3,653,695 to Dunton et al, 3,353,848 to Bleasby, 3,066,961 to Gerin and 3,637,239 to Daniel.

SUMMARY AND OBJECTS OF THE INVENTION

The present invention provides an economically fabricatable coupling means for use in a hydrostatic transmission which provides effective sealing in very high pressure utilization while also providing accommodation for both axial and lateral movements of the coupled members with respect to one another. The instant coupling comprises four basic elements which are easily assembled to form the completed coupling. A mounting block is sealingly attached by convenient means to the inlet or outlet portion of the hydraulic pump or motor and an end portion of the associated manifold is provided with a pressure responsive expansible elastomeric sealing ring along with a rigid back-up ring which closely fits the dimension of an annular bore cut in said mounting block. Such mounting block bore exceeds the outside diameter of the manifold end portion by an amount which provides the desired movement accommodation. With these components in position a second mounting block is slid into abutting relationship with a portion of the first mounting block and a protruding portion of the second mounting block abuts a portion of said rigid back-up ring. With all components in position, the second mounting block is tightened by suitable means into firm engagement with respect to the first mounting block.

An object of the present invention is to provide a movement accommodating coupling for the elements of a hydrostatic transmission which provides a pressure responsive expansible elastomeric sealing ring to provide complete fluid sealing while providing a removable protector or back-up ring which retains said elastomeric sealing ring in position while limiting the amount of deformation of said elastomeric ring to a predetermined degree.

Another object of the invention is to provide a method of assembly of a movement accommodating coupling means which allows the secure disposition of the elastomeric sealing ring within the coupling means without causing damage to said elastomeric sealing ring.

Yet another object of the instant invention is to provide a coupling means which comprises two mating annular block members having corresponding parts which define, when assembled, a retaining groove for the disposition of an annular elastomeric sealing ring and a rigid back-up ring for the retention and projection of such sealing ring. Said mating mounting blocks are provided with enlarged bore means which allow lateral or angular movement of the corresponding components.

Other objects and advantages of the present invention will become apparent upon reference to accompanying drawings and following description.

DETAILED DESCRIPTION

Figure 1:
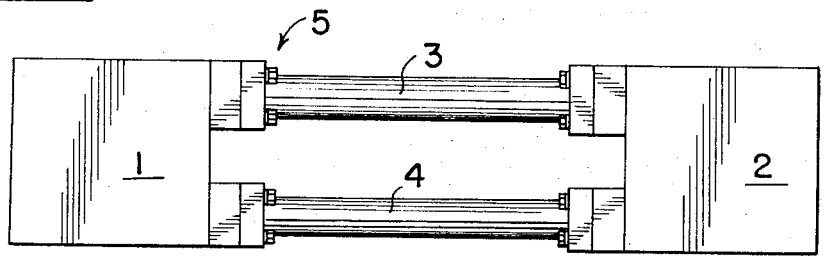
FIG. 1 is a schematic illustration of a hydrostatic transmission embodying the inventive coupling.

With reference to FIG. 1 in the drawings, a hydrostatic transmission is shown which comprises a hydraulic fluid pump 1 and hydraulic motor 2 suitably connected for fluid communication by means of manifolds 3 and 4 either of which acts as an inlet or outlet conduit for the pump depending upon the direction of fluid flow in the system. Shown generally at 5, is a movement accommodating coupling means for connecting the manifold 3 to the pump 1. Three other couplings are shown in FIG. 1 and each is identical to that shown at 5. Only one of such coupling means will be described because of such identity.

Figure 2:
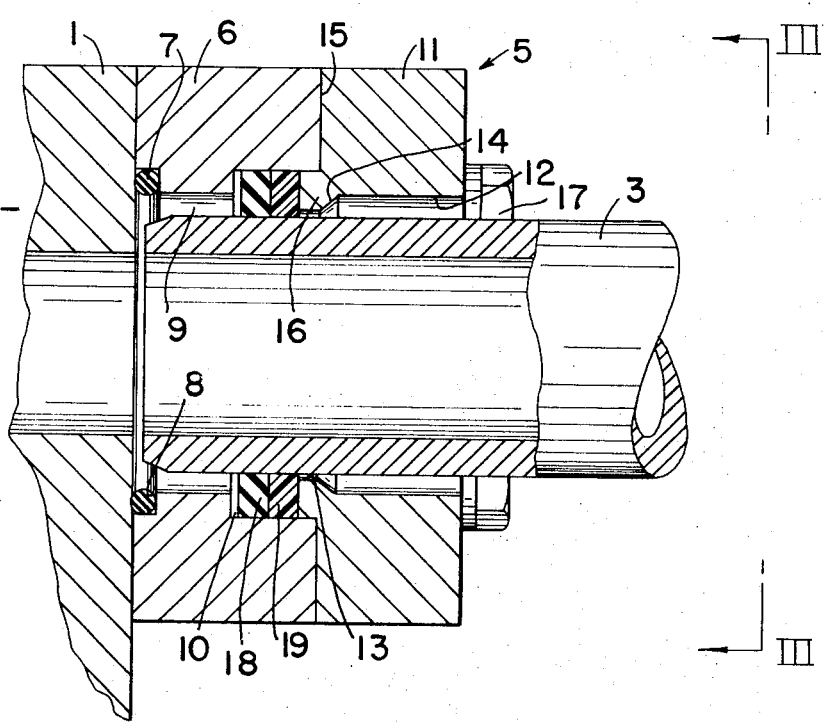
FIG. 2 is an enlarged transverse horizontal sectional view of one of the four couplings shown in FIG. 1.
Figure 3:
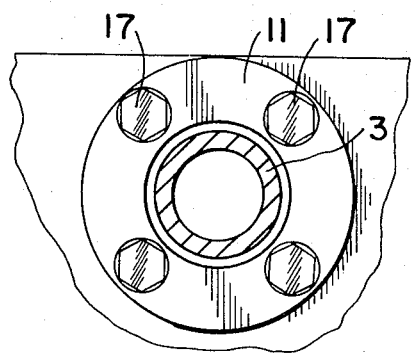
FIG. 3 is a sectional view of the invention taken along the line III—III of FIG. 2.

With reference to FIG. 2, an enlarged sectional view of the coupling 5 may be seen. At the point of connection with the manifold 3 the hydraulic pump is provided with a mounting block 6 which is connected to the hydraulic pump by suitable fastening means and which is provided with a sealing ring 7 mounted within a counterbore which forms with said portion of a hydraulic pump 1 a ring retaining groove. The mounting block 6 is provided with stepped bores 9 and 10 for a purpose to be described more fully hereinafter. Both bores 9 and 10 are substantially larger than the outside diameter of the manifold 3 which is received thereby.

A second mounting block is provided at 11 in mating engagement with the first mounting block 6. Block 11 is provided with bores 12 and 13 which are connected by a conical portion 14. An interface portion 15 of the block 11 is milled or otherwise machined so as to form an abutting surface for engagement with a like surface on the block 6. A protuberance or shoulder portion 16 is adapted to be received within the bore 10 of the mounting block 6 as shown. A plurality of cap screws 17 or the like are threadably received in the block member 6 and act to securely tighten the block 11 against the mounting block 6. It should be noted that the cap screws 17 could be threadably received by the inlet portion of the pump 1 if desired to provide unitary securing means for the entire coupling assemblage including the block 6. Alternatively, separate means could be provided for connecting the block 6 to the pump 1. In the former case, however, the cap screws 17 would transpierce the entire assemblage and fasten tightly to the pump body 1.

As is clearly shown in FIG. 2, the bore 10 of the block member 6 and the protuberance 16 of the mounting block 11 form a seal retaining groove when the respective mounting blocks are assembled. Disposed within this groove is a flexible elastomeric sealing ring 18 which is capable of deforming under pressure for a tight fluid seal between the mounting block 6 and the manifold 3. Disposed in abutting relationship to the elastomeric seal, is a rigid back-up ring 19 which could be fabricated from a synthetic material or rigid plastic material and dimensioned so that the inside diameter of the back-up ring is only slightly larger than the outside diameter of the manifold 3. The thickness of this back-up ring 19 is such that the manifold 3 can tilt or rock slightly laterally about the back-up ring as a fulcrum. The purpose of this back-up ring is to prevent the easily deformable elastomeric ring 18 from unduly deforming or possibly blowing out of the mounting block bores under the influence of extremely high fluid pressure in use.

The coupling means is assembled in such a fashion that elastomeric ring 18 is not damaged. When connection of the manifold to the pump 1 is desired, the end portion of the manifold 3, shown in FIG. 2, is fitted with the mounting block 11, the retainer back-up ring 19, and the elastomeric sealing ring 18. The manifold end portion, with such components attached, is then drawn into the mounting block 6 and the cap screws 17 are firmly tightened down. This causes the elastomeric seal 18 to seat within the bore 10 of the mounting block 6. The mounting block protuberance 16 provides a uniform pressure for seating the elastomeric seal ring and provides a flat shoulder for abuttment against the back-up ring 19 to prevent the possibility of "nibbling" damage to the inner diameter of the seal ring 18 which damage could cause leakage.

In view of the foregoing, it is readily apparent that the structure of the present invention provides a movement accommodating coupling means which provides a fluid-tight connection between a manifold and a pump while accommodating slight axial or lateral movements between such elements. With the present invention, only a low tolerance in the length of the manifold is required and precise alignment between the motor and hydraulic pump is not required. The instant coupling has few parts, is inexpensively fabricatable, and does not require critical adjustments.

While the invention has been described and shown with particular reference to the preferred embodiments, it will be apparent that variations are possible which would fall within the spirit of the present invention, which invention is not intended to be limited, except by the scope of the appended claims.

We claim:

1. Movement accommodating coupling means for sealingly coupling first and second fluid conducting means, said coupling means including; first mounting block means sealingly connected to said first fluid conducting means, second mounting block means sealingly connected to said first mounting block means, said first and second mounting block means having first and second bore means therein for receiving said second fluid conducting means, expansible sealing means for sealingly expanding and deforming under the influence of fluid pressure mounted within said first bore means, back-up means for limiting the deformation of said expansible sealing means, said back-up means being mounted within said first bore means in abutting engagement with said expansible sealing means, said first and second bore means having corresponding dimensions which are larger than those of said second fluid conducting means for allowing limited movement of said second fluid conducting means relative to said first fluid conducting means.

2. The invention of claim 1 wherein said second mounting block means includes a protuberance which extends into a portion of said first bore means and which directly engages and retains in position said back-up means.

3. The invention of claim 2 wherein said first bore means include stepped cylindrical bore portions having first and second predetermined respectively larger diameters, said expansible seal means being disposed within a bore portion having said second predetermined diameter and said portion having said first predetermined diameter forming a shoulder portion in said first mounting block means for retaining said expansible seal means within said bore means.

4. The invention of claim 2 wherein said back-up means retaining protuberance of said second mounting block means forms a portion of said second bore means which is smaller than all remaining portions of said second bore means.

5. The invention of claim 1 wherein said expansible sealing means include an elastomeric sealing ring and wherein said second fluid conducting means is a cylindrical conduit.

6. The invention of claim 5 wherein said back-up means include a thin rigid ring member having two flat opposing face portions and having an outside diameter substantially the same size as the largest portion of said first bore means and having an inside diameter slightly larger than the outside diameter of said cylindrical conduit.

7. The invention of claim 1 wherein said first and second mounting block means include first and second disc-shaped members having mating surfaces and wherein said first and second mounting block means are attached to each other by removable fastening means.

8. The invention of claim 7 wherein said fastening means include a plurality of threaded cap screws which transpierce said first and second mounting block means.

* * * * *